United States Patent [19]
Li et al.

[11] Patent Number: 5,599,450
[45] Date of Patent: Feb. 4, 1997

[54] ANAEROBIC UPFLOW BATCH REACTOR

[75] Inventors: Yanlong Li, Lenexa, Kans.; Kenneth L. Norcross, Kansas City, Mo.

[73] Assignee: Jet Tech, Inc., Edwardsville, Kans.

[21] Appl. No.: 560,740

[22] Filed: Nov. 20, 1995

[51] Int. Cl.⁶ .................................................. C02F 3/30
[52] U.S. Cl. ..................... 210/603; 210/605; 210/629; 210/122; 210/194; 210/242.1
[58] Field of Search ................................. 210/603, 605, 210/629, 630, 903, 122, 194, 202, 540, 242.1

[56] References Cited

U.S. PATENT DOCUMENTS

| | | | |
|---|---|---|---|
| 4,253,956 | 3/1981 | Pette | 210/188 |
| 4,648,967 | 3/1987 | Calltharp et al. | 210/525 |
| 4,655,925 | 4/1987 | Tabata et al. | 210/605 |
| 4,663,044 | 5/1987 | Goronszy | 210/610 |
| 4,956,100 | 9/1990 | Mikkleson | 210/122 |
| 4,997,557 | 3/1991 | Anderson | 210/242.2 |
| 5,185,079 | 2/1993 | Dague | 210/603 |
| 5,192,442 | 3/1993 | Piccirillo et al. | 210/605 |

OTHER PUBLICATIONS

Dague, R. R.; Habben, C. E.; Pidaparti, S. R.; Initial Studies on the Anaerobic Sequencing Batch Reactor; *Wat. Sci. Tech;* Vo. 1–26; No. 9–11; pp. 2429–2432; 1992.

Kennedy, K. J.; Sanchez, W. A.; Hamoda, M. F.; Droste, R. L.; Performance of anaerobic sludge blanket sequencing batch reactors; *Research Journal WPCF;* vol. 63, No. 1; 1991.

*Primary Examiner*—Christopher Upton
*Attorney, Agent, or Firm*—Wolf, Greenfield & Sacks, P.C.

[57] ABSTRACT

A method for providing a uniform plug flow through an anaerobic wastewater treatment reactor includes distributing incoming wastewater generally evenly near the bottom of reactor and evenly collecting the wastewater near an upper level thereof so as to produce upward plug flow through the reactor during filling, recycle and decanting and minimize horizontal mixing. Such plug flow encourages growth of heavier biomass near the bottom of the reactor where substrate is greatest and discourages growth of light biomass near the top of the reactor where substrate is least. Wastewater is also preferably recycled from the top to the bottom of the reactor. Apparatus is provided to be used in conjunction with the method. The apparatus is also usable in conjunction with a subsequent aerobic sequencing batch reactor.

9 Claims, 3 Drawing Sheets

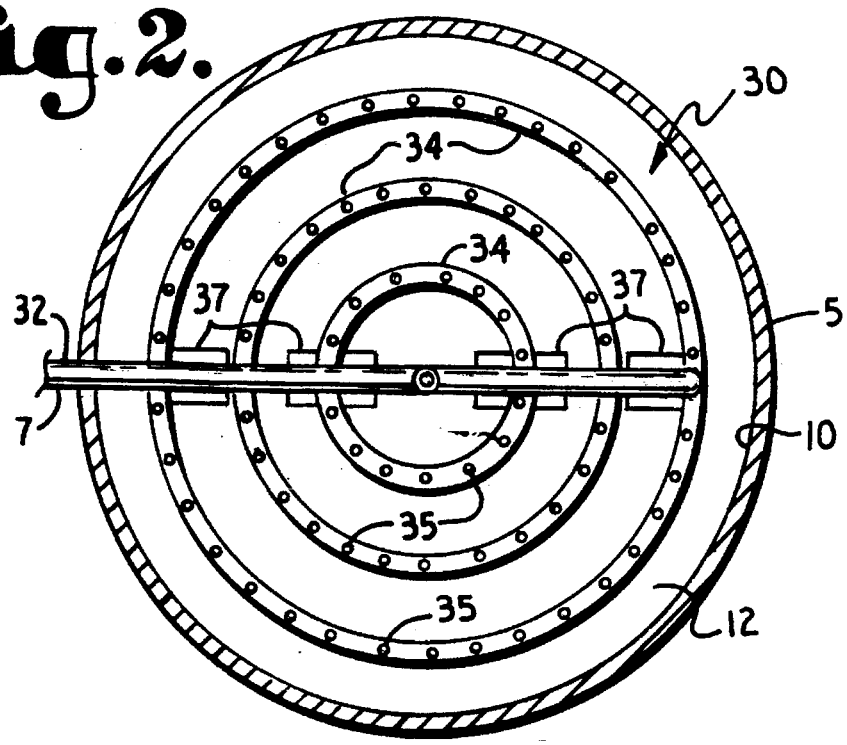
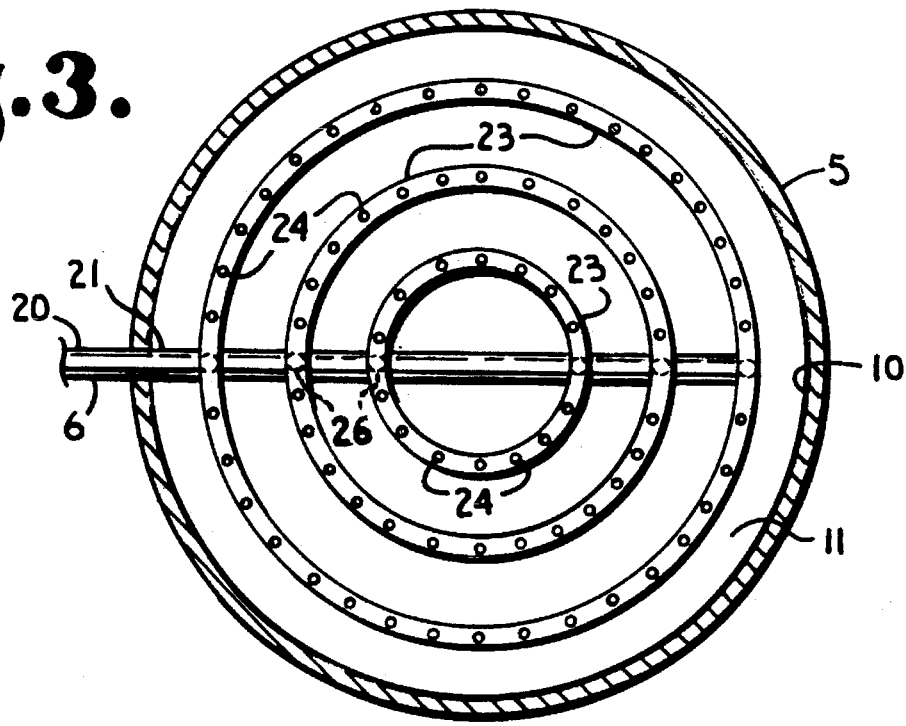

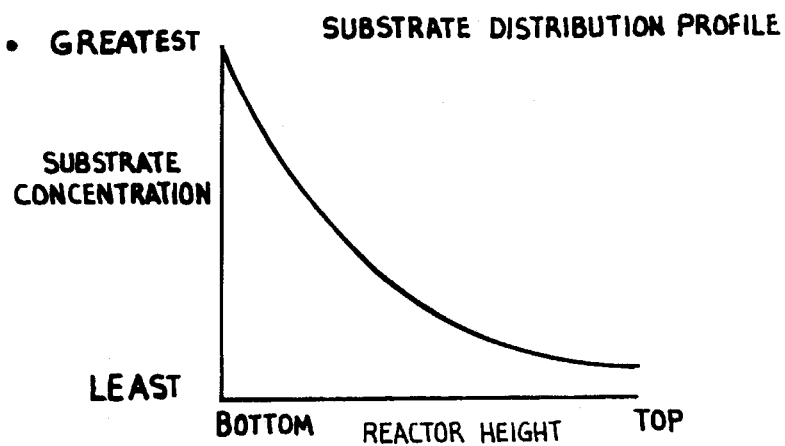
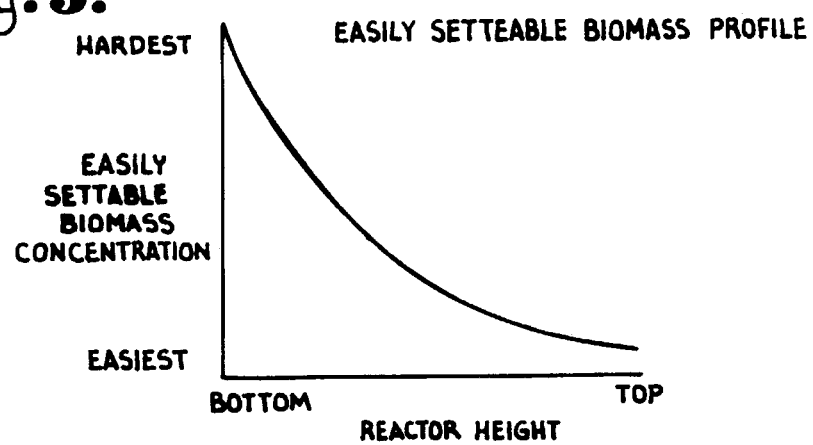
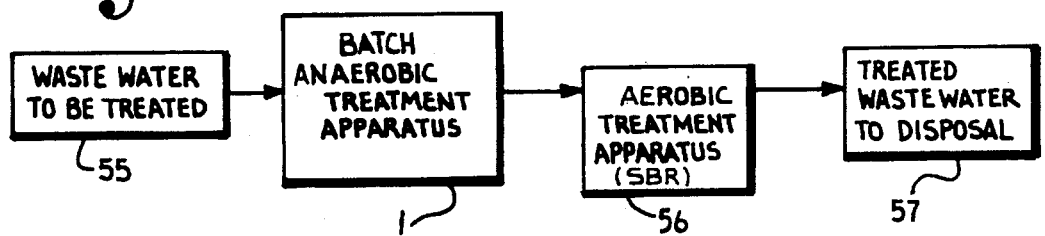

ANAEROBIC UPFLOW BATCH REACTOR

BACKGROUND OF THE INVENTION

The present application is directed to an anaerobic upflow batch reactor for the removal of contaminants, especially organic contaminants, from waste water utilizing a processing method wherein the waste water being treated flows in a plug flow configuration from near the bottom of the reactor to near the top of the fluid within the reactor.

Historically, numerous systems have been developed by waste water engineers for the treatment of waste water to remove impurities therefrom. Such systems have included continuous flow type reactors as well as batch type reactors. Systems have also included aerobic, anaerobic and combinations of aerobic and anaerobic treatments of the waste water. The present invention is directed to a modification of anaerobic batch systems in order to produce special processing characteristics within the system.

In particular, upflow batch reactor systems have been produced in the past for treating the waste water and an example of such a system is shown in the Dague U.S. Pat. No. 5,185,079. Batch reactors have certain advantages over continuous flow reactors in that the material to be treated can be positively maintained within the batch reactor until the process is complete whereas in continuous flow reactors there is a possibility of incomplete reaction before the waste water exits the process.

The inventors of the present invention have found that careful control of certain parameters of a batch system substantially enhances the ability of the batch reactor to complete its task. In particular, they have discovered that, if the flow through the reactor can be maintained as a substantially true plug flow from near the bottom of the reactor to near the top of the liquid, a reaction gradient can be produced that has special advantages to the operation to the system. However, these advantages are mostly lost if flow in the reactor is not plug flow throughout. This is true even where the flow starts as plug flow, but does not raise substantially vertically through the reactor, such as where there is a side takeoff and a substantial amount of the flow is horizontal or diagonal relative to the reactor.

In particular, if the concentration of the biomass and food substrate which feeds the biomass within the waste water can be carefully controlled to move through the reactor in a movement that is designed to pass from the bottom of the reactor to near the top of the liquid in a mostly vertical direction (that is the individual molecules have a mainly vertical vector associated therewith and without substantial mixing, the advantageous growth of particular types of biomass in particular areas of the reactor can be enhanced and the biomass that might otherwise be entrained with the fully treated liquid, as the liquid leaves the reactor, can be substantially reduced.

The prior art upflow anaerobic batch reactors of the type shown in the above noted Dague patent have failed to take advantage of such a system and, in particular, have typically withdrawn fluid from the reactor from the side or otherwise unevenly such that movement through the reactor is not substantially up and down, but rather has a substantial sideways component. Withdrawal from the side, as in Dague and other prior art references, causes mixing which also defeats the goals of the process of the present application.

SUMMARY OF THE INVENTION

The present invention is directed to a method and apparatus for treatment of waste water to remove impurities, especially organic impurities, therefrom. In accordance with the invention waste water to be treated is flowed upwardly from near the bottom of a reactor to near the top of the fluid contained within the reactor while removing the fluid from the top in a generally uniform manner that requires the fluid to flow mostly upward rather than sideways, such that the waste water rises vertically throughout most of the process or in a plug flow fashion. That is, the waste water rises from near where it enters the reactor to near where it exits the reactor in a somewhat linear path rather than moving substantially sideways within the reactor and being withdrawn from the side of the reactor or being heavily mixed within the reactor. Obviously when speaking of fluid there is going to be a certain amount of mixing at any one time and there is normally a minimal amount of sideways flow especially near the withdrawal and input ports, since the ports require some spacing, but it is desirable to maintain mixing and sideways flow at a relatively low level and to maintain it on a local rather than regional basis within the reactor. Preferably, the waste water enters the reactor at numerous sites or ports spaced across the bottom of the reactor in somewhat of a uniform pattern and exits the reactor through similar locations or ports near the top of the fluid.

The reactor is operated as an upflow anaerobic reactor. As used herein the term anaerobic means that there is not a substantial amount of oxygen added to the fluid within the reactor, as is done in aerobic type reactors. It is possible that a certain amount of dissolved oxygen, which enters the anaerobic reactor with the waste water or otherwise, may be found within the reactor, but the major difference in comparison to aerobic processes is that substantial quantities of oxygen are not added to the fluid within the reactor. This enhances the growth of anaerobic type bacteria and other micro-organisms rather than aerobic type micro-organisms.

The purpose of operating the reactor in a plug flow mode and anaerobic state is to produce a gradient of biomass within the reactor that is preferential to the treatment of the waste water and so as to prevent a substantial portion of the biomass from leaving the reactor with the waste water that has been treated therein. The biomass within the reactor is made up of joined micro-organisms and it is preferable in accordance with this invention to encourage growth of heavier and larger biomass groups that have a tendency to remain near the bottom of the reactor or float in lower levels of fluid within the reactor, for example most floats and stays in the lower third of the fluid layer. Preferably light and highly floatable types of biomass, which are normally small clumps of micro-organisms as compared to the remaining biomass and which would likely float in the upper portion of the fluid layer, for example in the upper third of the fluid layer, are maintained at relatively low concentration throughout the reactor.

OBJECTS AND ADVANTAGES OF THE INVENTION

Therefore, the objects of the present invention are: to provide a waste water treatment process wherein waste water flows through a reactor in anaerobic conditions in a plug flow configuration; to provide such a process encouraging a biomass growth that decomposes contaminates within the waste water in such a pattern that the heaviest biomass concentration is near the bottom of the reactor and very little biomass concentration is near the top of the reactor; to provide a system wherein the process promotes the growth of heavier and larger biomass concentrations that remain near the bottom of the reactor and discourages the growth of lighter and smaller biomass concentrations that would tend to float higher in the reactor; to provide such a process wherein a gradient of decomposable food stuffs for the biomass or substrate is heaviest in the lower part of the reactor so as to encourage growth of suitable bacteria therein and lightest near the top of the fluid within the reactor so as to discourage growth of biomass in the upper portion of the reactor; to provide such a process wherein waste water is distributed at multiple locations spaced across the lower end of the reactor and withdrawn from similar multiple spaced locations across a withdrawal decanter located near the top of the fluid in the reactor so as to encourage waste water to rise relatively vertically through the reactor without substantial sideways movement and without substantial global mixing; to provide such a process for the recirculation of waste water from near the top of the fluid within the reactor to near the bottom thereof; to provide such an anaerobic process in combination with an aerobic waste water treatment process, especially an aerobic sequencing batch reactor, such that the anaerobic process functions to polish or further purify the waste water leaving the aerobic process; to provide an apparatus for use in conjunction with such a process; and to provide such a process an apparatus that are especially easy to operate, relatively inexpensive to produce and especially well suited for their intended usage. Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a cross sectional view of the reactor, taken along line 2—2 of FIG. 1.

FIG. 3 is a cross sectional view of the reactor, taken along line 3—3 of FIG. 1.

FIG. 4 is a chart showing a typical substrate distribution profile in accordance with the present invention.

FIG. 5 is a chart showing a typical easily setteable biomass profile in accordance with the present invention.

FIG. 6 is a flow chart illustrating a modified process according to the present invention including both aerobic and anaerobic process apparatus.

DETAILED DESCRIPTION OF THE INVENTION

Figure 1:
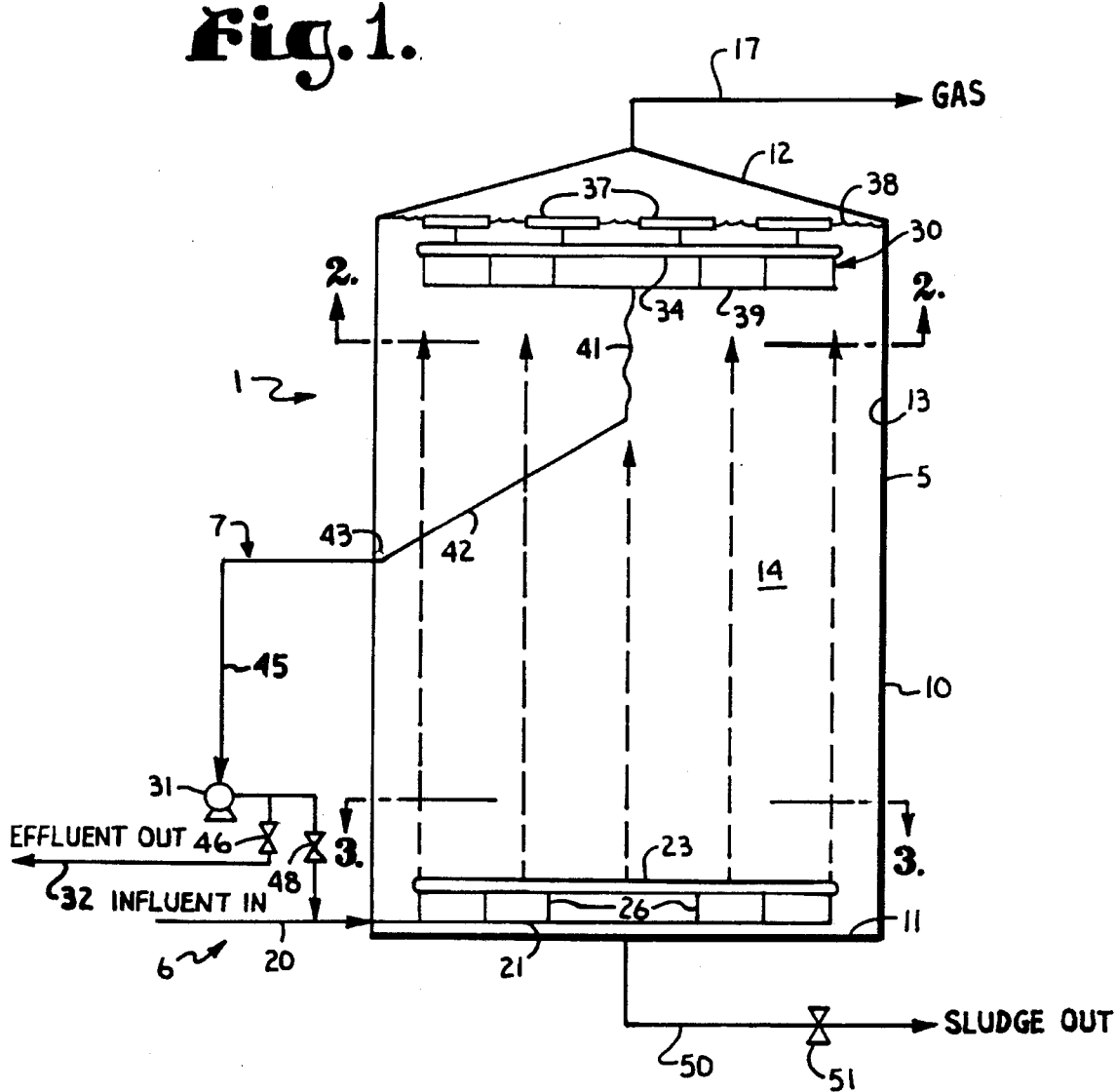
FIG. 1 is a side elevational and schematical view of a process in accordance with the present invention utilizing an anaerobic and upflow waste water treatment reactor.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an apparatus for treating waste water in accordance with the present invention. The apparatus 1 includes a vessel or tank 5, an influent system 6 and an effluent system 7.

The tank 5 has a cylindrical sidewall 10, a bottom 11 and a top 12 so as to form an inclosure 13 for receiving fluid 14 therein. The tank top 12 is raised in the center and the interior flow connects with a vent pipe 17 for transferring gas away from the tank 5.

The influent system 6 includes a conduit 20 joined at one end to a source of influent waste water and at the other end to a distribution manifold 21 within the tank 5. The distribution manifold 21 includes a series of spaced concentric and circularly shaped pipes 23 having spaced apertures 24 flow opening to the interior thereof and located along the top thereof. Each of the pipes 23 is flow connected interiorly and flow connected to liquid within the tank 5 through the apertures 24. The pipes 23 are also flow connected to a conduit 26 forming the remainder of the distribution manifold 21 which in turn flow connects with the conduit 20 such that influent can be distributed from the conduit 20 through the distribution manifold 21 and flow from the apertures 24 within the tank 5. Because of the spacing of the pipes 23 and the apertures 24, fluid is preferably dispersed in a generally uniform upward flowing pattern over the entire lower end of the tank 5. In particular, the pipes 23 are located close to the tank bottom 11 such that the influent flows into the tank 5 near the bottom 11 thereof.

The effluent system 7 includes a collection manifold 30 a pump 31 and a discharge conduit 32. The collection manifold 30 includes a series of pipes 34 which are essentially a mirror image of the pipes 23 of the distribution manifold 21. In particular, the pipes 34 are circular and arranged concentrically relative to one another with approximate equal spacing therebetween. Each of the pipes 34 include a series of evenly spaced apertures 35 thereabout. The apertures 35 face downward and toward the apertures 24 and are aligned so as to encourage the flow of water vertically between two opposed apertures 24 and 35 without substantial mixing within the tank 5. Although some mixing must occur in such a process, it is preferable to keep such mixing to a minimum in accordance with the invention.

The collection manifold 30 includes a series of floats 37 which are attached to the collection manifold 30 so as to allow it to freely float within liquid or fluid 14 within the tank 5. In particular, the floats 37 float at the surface 38 of the liquid 14 within the tank 5 and maintain the collection manifold 30 at a fixed spacing from the surface 38. Preferably the pipes 34 are spaced anywhere from several inches to eighteen inches from the surface 38 so as to discourage the entranement of scum floating on the surface 38 into the apertures 35. The collection manifold 30 also includes a joining conduit 39 that flow connects with each of the pipes 34 and in turn with each of the apertures 35 so that liquid within the tank 5 can flow into the conduit 39. Attached to the conduit 39 is a flexible conduit 41 which flow connects with a pivotable conduit 42. The pivotable conduit 42 is connected to the side of the tank 5 by a hinge 43 which allows the entire collection manifold 30 from the pivotable conduit 42 to the floats 37 to move vertically within the tank 5 so as to allow the pipes 34 to remain in a fixed position relative to the liquid surface 38 as the liquid surface 38 moves vertically within the tank 5. Centering struts or the like (not shown) may be utilized to keep the collection manifold 30 centered when needed.

The pivot conduit 42 is flow connected to a conduit 45 which in turn is connected to the pump 31. The pump 31 discharges through a valve 46 into the discharge conduit 32. In this manner fluid can be pumped from the interior of the tank 5 through the apertures 35, through the pump 31 and out the discharge conduit 32 when the valve 46 is open. The fluid pumped from the discharge conduit 32 is treated waste water and is transferred to storage, discharged to a stream or otherwise disposed of. The conduit 45 also connects with the influent conduit 20 through a valve 48. When the valve 48 is open, the valve 46 is closed and the pump 31 is operating, liquid within the tank 5 can be recirculated from near the top of the tank 5 through the apertures 35 to near the lower end of the tank 5 through apertures 24.

Connected to the tank bottom 11 is a sludge discharge conduit 50 which is flow connected to a storage location for receiving excess sludge (not shown) under control of a valve 51. In this manner excess sludge can be removed from the tank 5 and disposed to storage or other treatment.

Although the apparatus 1 may be utilized by itself in the treatment of waste water, it can also be utilized with other facilities. One such example would be to polish or further clean the water by destroying remaining organic materials contained within the waste water after the waste water has been treated by another type of waste water treatment facility. Shown in FIG. 6 is such an installation where waste water to be treated as represented by the block 55 is transferred to an anaerobic treatment apparatus, such as has been previously described, 1 and then to an aerobic apparatus represented by the block 56. Such an aerobic apparatus may be a sequencing batch reactor or another type of waste water treatment apparatus. The waste water after being treated in the aerobic treatment apparatus 56 is then transferred to disposal represented by the block 57. A suitable aerobic treatment apparatus of the type required for the present invention is known to those skilled in the art and has previously been described. For example, U.S. Pat. No. 5,021,161 to Calltharp et al discloses such an aerobic process which is incorporated herein by reference.

In use the apparatus 1 is essentially an upflow, anaerobic, plug flow type system or process wherein waste water flows from near the bottom of the tank 5 to near the top thereof in a generally vertical flow pattern. While distribution cannot be made on such a minute scale and although all possible disruptions of flow cannot be eliminated to such an extent that there is no mixing within the fluid being treated within the tank 5, it is preferable that as little horizontal mixing as possible occur while the waste water is flowing into or being treated in the tank 5.

Normally, the batch process utilizing the apparatus 1 will be initiated with a fill cycle at which time the collection manifold 30 is positioned at its lowest position within the tank 5. The lower most position of the collection manifold 30 will somewhat depend upon the interface level where clarified water occurs within the tank at the end of the previous batch process. In particular, the waste water is treated within the tank by reaction of substrate, which includes organic materials to be decomposed by the process, with biomass within the tank 5. Initially, the biomass forms a blanket near the bottom of the tank 5 and is composed of micro-organisms, especially anaerobic bacteria. As waste water flows into the tank 5 through the apertures 35, the waste water flows upwardly through a portion of this biomass such that the substrate within the waste water interacts with the biomass. The biomass is normally somewhat denser than the fluid within the tank and, therefore sinks to near the bottom of the tank. As the waste water entering the tank 5 flows through the biomass, a portion of the biomass rises with the fluid. This biomass that raises with the fluid has a tendency to rise to different levels within the tank 5 depending upon the type of biomass encountered.

In particular, relatively heavy and larger clumps of biomass are typically formed of certain types of bacteria and protein linkages which tend to stay nearer to the bottom of the tank then to the top. On the other hand there are relatively light micro-organism clumps which have a tendency to be easily floated and will be more likely to be found in the upper portion of the tank 5 during treatment. In accordance with the present invention it is preferable to encourage the growth of the heavier or denser micro-organism clumps that are more likely to be found near the bottom of the tank and which are more easily settled and to discourage the growth of the lighter and easily floatable micro-organism clumps of biomass that are likely to rise within the tank 5. Preferred substrate and biomass profiles are shown in FIGS. 4 and 5.

A major reason for preferring to have the larger portion of the biomass near the bottom of the tank 5 is that the biomass then settles quickly at the end of treatment during a settling cycle so that a substantial period of time is not required to settle the biomass. Furthermore, if there is little biomass within the upper region of the tank 5 at the time treatment is stopped, often decanting or removal of the treated waste water from near the top of the tank 5 can be initiated through the collection conduit 30 prior to complete settlement of the biomass in the lower regions of the tank 5. This substantially reduces the cycle time on each batch treatment by the apparatus 1.

Consequently, during a complete treatment cycle, the waste water coming in to the apparatus 1 is flowed through the apertures 24 into the tank 5 near the bottom 11 thereof and rises in substantially a plug flow pattern upwardly through the tank. Plug flow without substantial mixing is highly preferred in the present invention as this prevents short cutting or incomplete decomposition of impurities in the waste water within the system. That is, if certain portions of the fluid flow sideways or at an angle with respect to verticle, fluid with a high percentage of substrate may inappropriately mix with fluid having a low percentage of substrate so that there is not a uniform pattern of substrate within the fluid at different vertical levels within the fluid in the tank 5.

In accordance with the invention it is highly preferred that the largest concentrations of substrate or food for the biomass be located in the levels of fluid that are closest to the entry of the fluid into the tank, that is at the apertures 24. This is seen in FIG. 4 which is a chart showing a preferred concentration of substrate over the height of the liquid layer between the distribution manifold 21 and the collection manifold 30. The purpose of increasing the amount of substrate at the lower end of the liquid 14 within the tank 5 is to encourage the growth of biomass near the lower end of the fluid 14 and to discourage the growth of the light biomass near the upper end thereof. In this manner likewise the denser and more enlarged clumps of biomass are encouraged to grow and the lighter and smaller clumps of biomass are discouraged from growth. The chart shown in FIG. 5 illustrates the biomass profile over the height of the tank 5. Consequently, it is preferred to have the heaviest substrate and heaviest biomass near the lower end of the tank and the lightest biomass and lightest substrate concentration near the upper end of the liquid.

During treatment, liquid may be withdrawn from near the upper end of the flush level 14 through the collection manifold 30 and through the pump 31 so as to be distributed back into the distribution manifold with the valve 48 open and the valve 46 closed. In this manner fluid 14 that needs somewhat further treatment can be recycled in the same manner as discussed for incoming fluid so as to likewise encourage the biomass growth discussed above. In general fluid flow in, fluid flow out and combined fluid flow in and out to produce recycle are all plug flows.

It is possible to operate the process utilizing the apparatus 1 at psychrophilic temperatures, mesophilic temperatures, or thermophilic temperatures. If the system is operated in the mesophilic or thermophilic temperature ranges, normally some type of heating mechanism must be utilized to provide heat to the liquid within the reactor or tank 5. This can be accomplished by providing exchange of heat between influent and effluent in a heat exchanger and heating the recycling fluid by a heat exchanger (not shown) located external to the tank or by within the tank 5.

It is to be understood that while certain forms of the present invention have been illustrated and described herein, it is not to be limited to the specific forms or arrangement of parts described and shown.

What is claimed and desired to be secured by Letters Patent is as follows:

1. A method of operating a batch flow anaerobic waste water treatment reactor comprising the steps of:
   a) flowing waste water containing substrate to be treated into a substantially anaerobic reactor containing an active biomass until a preselected batch volume is present in the reactor;
   b) flowing the wastewater including the substrate into the reactor near a bottom thereof during filling of the reactor;
   c) thereafter flowing the wastewater including the substrate upwardly through the reactor while returning wastewater from a top of the reactor to near a bottom thereof without the addition of substantial wastewater to the reactor once said batch volume is obtained;
   d) controlling the flow pattern and velocity of the wastewater so that flow through the reactor is substantially plug flow from near the bottom of the reactor to near the top of a wastewater level therein so as to minimize horizontal movement and mixing of the wastewater within the reactor and so as to have a relatively higher concentration of substrate within the wastewater near the bottom of the reactor and a relatively lower concentration of substrate near the top of the reactor to selectively enhance the growth of relatively heavy biomass near the bottom of the reactor and to selectively inhibit the growth of relatively light biomass near the top of the reactor; and
   e) subsequent to treatment in the reactor, flowing a substantial portion of treated wastewater from the reactor.

2. The method according to claim 1 including the steps of:
   a) recycling withdrawn wastewater from near the top of the reactor to near the bottom of the reactor until substantially all substrate within the wastewater is utilized by the biomass within the reactor; and
   b) thereafter stopping the recycling and allowing the heavier biomass to settle to near the bottom of the reactor
   e) thereafter decanting an upper portion of the wastewater substantially free of substrate and heavier biomass from the reactor.

3. The method according to claim 1 including the step of:
   a) subsequent to flowing the wastewater into the anaerobic reactor, treating the wastewater in an aerobic sequencing batch reactor.

4. The method according to claim 1 including the steps of:
   a) distributing wastewater into said reactor through a distribution manifold and withdrawing wastewater from said reactor through a collection manifold; and
   b) providing said distribution manifold and said collection manifold with a plurality of apertures generally evenly spaced across a horizontal cross section of said reactor such that wastewater flows generally vertically without substantial horizontal mixing through the reactor in plug flow.

5. An anaerobic wastewater treatment reactor apparatus comprising:
   a) an enclosed vessel having a top and a bottom;
   b) inlet piping flow connected to an interior of said vessel through a distribution manifold; said distribution manifold located near the bottom of the vessel;
   c) outlet piping flow connected to the interior of said vessel through a collection manifold;
   d) said collection manifold including floats so as to be supportable by said floats near an upper surface of liquid within said reactor and said outlet piping being flexible so as to allow the collection manifold to raise and fall within the reactor with a liquid level therein; and
   e) said distribution manifold and said collection manifold each including a pipe manifold which extends horizontally over a substantial portion of a crossection of said vessel; each of said pipe manifolds including a plurality of spaced apertures to allow flow of wastewater from and into respectively the manifolds such that wastewater entering the vessel near the bottom thereof flows upward through the reactor in plug flow and with minimal horizontal mixing.

6. The apparatus according to claim 5 including:
   a) a pumping mechanism flow connected to said distribution manifold and said collection manifold with valving to control flow therethrough to allow selective recycle of wastewater from the collection manifold to the distribution manifold.

7. The apparatus according to claim 5 including:
   a) an aerobic sequencing batch reactor flow connected to said anaerobic reactor and flow located such that wastewater enters said aerobic reactor subsequent to entering said anaerobic reactor.

8. The apparatus according to claim 5 wherein each of said piping manifolds comprises:
   a) a series of interconnected and horizontally spaced rings with said apertures being located in said rings such that the apertures in said distribution ring face the apertures in said collection ring.

9. In a waste water treating anaerobic reactor; the improvement comprising:
   a) a wastewater distributing manifold having a plurality of horizontally spaced outlets and being located near a bottom of said reactor; and
   b) a wastewater collecting manifold having a plurality of horizontally spaced inlets and including floats for floating the collecting manifold near an upper level of wastewater within the reactor such that when wastewater enters the reactor through the distribution manifold, the wastewater flows in plug flow into the reactor and when the wastewater exits the reactor, the wastewater flows in plug flow to the collection manifold.

* * * * *